United States Patent
Cabrera et al.

(10) Patent No.: US 10,937,109 B1
(45) Date of Patent: Mar. 2, 2021

(54) METHOD AND TECHNIQUE TO CALCULATE AND PROVIDE CONFIDENCE SCORE FOR PREDICTED TAX DUE/REFUND

(71) Applicant: Intuit Inc., Mountain View, CA (US)

(72) Inventors: Luis Felipe Cabrera, Bellevue, WA (US); William T. Laaser, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 1098 days.

(21) Appl. No.: 14/991,460

(22) Filed: Jan. 8, 2016

(51) Int. Cl.
*G06Q 40/00* (2012.01)

(52) U.S. Cl.
CPC ................... *G06Q 40/123* (2013.12)

(58) Field of Classification Search
CPC .................................................. G06Q 40/123
USPC .......................................................... 705/31
See application file for complete search history.

(56) References Cited

U.S. PATENT DOCUMENTS

| | | | |
|---|---|---|---|
| 5,285,384 A | 2/1994 | Gineris | |
| 5,884,283 A | 3/1999 | Manos | |
| 6,021,397 A | 2/2000 | Jones et al. | |
| 6,401,080 B1 | 6/2002 | Bigus et al. | |
| 6,871,322 B2 | 3/2005 | Gusler et al. | |
| 7,010,507 B1 | 3/2006 | Anderson et al. | |
| 7,181,438 B1 | 2/2007 | Szabo | |
| 7,240,297 B1 | 7/2007 | Anderson et al. | |
| 7,539,635 B1 | 5/2009 | Peak et al. | |
| 7,590,572 B2 | 9/2009 | Larson | |
| 7,603,301 B1 | 10/2009 | Regan | |
| 7,610,226 B1 | 10/2009 | Miller | |
| 7,636,742 B1 | 12/2009 | Olavarrieta et al. | |
| 7,680,756 B2 | 3/2010 | Quinn et al. | |
| 7,685,034 B1 | 3/2010 | Mori et al. | |
| 7,693,769 B1 | 4/2010 | Burlison et al. | |
| 7,716,094 B1 | 5/2010 | Sutter et al. | |
| 7,747,484 B2 | 6/2010 | Stanley et al. | |
| 7,769,647 B1* | 8/2010 | Char | G06Q 40/02 705/30 |

(Continued)

FOREIGN PATENT DOCUMENTS

| | | |
|---|---|---|
| JP | 2002-099613 | 4/2002 |
| KR | 10-2009-0089225 | 8/2009 |

OTHER PUBLICATIONS

Zhang, Zhenya, et al.; "Enabling Personalization Recommendation with WeightedFP for Text Information Retrieval Based on User-Focus," Proceedings of the International Conference on Information Technology: Coding and Computing (ITCC'04), 5 pp. (Year: 2004).*

(Continued)

*Primary Examiner* — Jessica Lemieux
(74) *Attorney, Agent, or Firm* — Paradice and Li LLP

(57) ABSTRACT

A method and system provides a tax refund confidence indicator to a user of a tax return preparation system, according to one embodiment. The method and system include receiving user current tax related data from a user and receiving historical tax related data associated with previously prepared tax returns. The method and system further includes generating estimated tax refund data and confidence score data indicative of the reliability of the estimated tax refund data. The method and system include providing the estimated tax refund data and the confidence score data to the user.

20 Claims, 3 Drawing Sheets

(56) References Cited

U.S. PATENT DOCUMENTS

| | | | |
|---|---|---|---|
| 7,778,895 B1 | 8/2010 | Baxter et al. |
| 7,809,622 B1 | 10/2010 | Fitch et al. |
| 7,818,222 B2 | 10/2010 | Allanson et al. |
| 7,831,688 B2 | 11/2010 | Linyard et al. |
| 7,836,406 B1 | 11/2010 | Kirsten et al. |
| 7,848,971 B1 | 12/2010 | Mori et al. |
| 7,849,405 B1 | 12/2010 | Coletta et al. |
| 7,860,763 B1 | 12/2010 | Quinn et al. |
| 7,904,356 B1 | 3/2011 | Cobarrubia |
| 7,930,226 B1 | 4/2011 | Quinn et al. |
| 7,945,522 B2 | 5/2011 | McGovern et al. |
| 8,001,006 B1 | 8/2011 | Yu et al. |
| 8,019,664 B1 | 9/2011 | Tifford et al. |
| 8,024,660 B1 | 9/2011 | Quinn et al. |
| 8,112,275 B2 | 2/2012 | Kennewick et al. |
| 8,190,499 B1 | 5/2012 | McVickar |
| 8,204,805 B2 | 6/2012 | Eftekhari et al. |
| 8,224,726 B2 | 7/2012 | Murray |
| 8,346,635 B1 | 1/2013 | Olim |
| 8,386,966 B1 | 2/2013 | Attinasi et al. |
| 8,407,113 B1 | 3/2013 | Eftekhari et al. |
| 8,417,596 B1 | 4/2013 | Dunbar et al. |
| 8,417,715 B1 | 4/2013 | Bruckhaus et al. |
| 8,418,920 B2 | 4/2013 | Lieberman et al. |
| 8,423,444 B1 | 4/2013 | Mackrell et al. |
| 8,429,184 B2 | 4/2013 | Ismalon |
| 8,433,627 B2 | 4/2013 | Agee et al. |
| 8,447,667 B1 | 5/2013 | Dinamani et al. |
| 8,452,676 B1 | 5/2013 | Talan et al. |
| 8,458,058 B2 | 6/2013 | Kuchs et al. |
| 8,492,999 B2 | 7/2013 | Cheng |
| 8,606,665 B1 | 12/2013 | Shaw |
| 8,635,127 B1 | 1/2014 | Shaw |
| 8,656,273 B1 | 2/2014 | Tifford et al. |
| 8,694,397 B2 | 4/2014 | Seubert et al. |
| 8,719,120 B1 | 5/2014 | McVickar et al. |
| 8,752,603 B2 | 6/2014 | Christ et al. |
| 8,812,380 B2 | 8/2014 | Murray et al. |
| 8,832,584 B1 | 9/2014 | Agarwal et al. |
| 8,857,713 B2 | 10/2014 | Lieberman et al. |
| 8,874,731 B1 | 10/2014 | Puppin |
| 8,903,810 B2 | 12/2014 | Ismalon |
| 8,942,999 B1 | 1/2015 | Fernando et al. |
| 9,037,962 B1 | 5/2015 | Vassar et al. |
| 9,069,580 B2 | 6/2015 | Armstrong et al. |
| 9,098,586 B1 | 8/2015 | Latif et al. |
| 9,117,247 B2 | 8/2015 | Lieberman et al. |
| 9,128,911 B1 | 9/2015 | Howe et al. |
| 9,153,141 B1 | 10/2015 | Kane et al. |
| 9,280,252 B1 | 3/2016 | Brandmaier et al. |
| 9,286,282 B2 | 3/2016 | Ling et al. |
| 9,330,415 B1 | 5/2016 | Castleman et al. |
| 9,390,402 B1 | 7/2016 | Kane et al. |
| 9,406,089 B1 | 8/2016 | Mori et al. |
| 9,412,017 B1 | 8/2016 | Huang et al. |
| 9,444,824 B1 | 9/2016 | Balazs et al. |
| 9,582,757 B1 | 2/2017 | Holmes et al. |
| 9,886,725 B1 | 2/2018 | Bober et al. |
| 9,911,160 B2 | 3/2018 | Lee et al. |
| 9,916,626 B2 | 3/2018 | Huang et al. |
| 9,916,627 B1 | 3/2018 | Huang et al. |
| 9,959,560 B1 | 5/2018 | Whitaker et al. |
| 9,990,678 B1* | 6/2018 | Cabrera ............... G06Q 40/123 |
| 10,096,072 B1 | 10/2018 | Ali et al. |
| 10,140,666 B1 | 11/2018 | Wang et al. |
| 10,169,828 B1 | 1/2019 | Morin et al. |
| 10,204,382 B2 | 2/2019 | Morin et al. |
| 10,628,894 B1 | 4/2020 | Ioannou et al. |
| 2002/0052774 A1 | 5/2002 | Parker et al. |
| 2002/0111888 A1 | 8/2002 | Stanley et al. |
| 2002/0133394 A1 | 9/2002 | Bushey et al. |
| 2003/0061131 A1 | 3/2003 | Parkan |
| 2003/0169371 A1 | 9/2003 | Chiang et al. |
| 2004/0078271 A1 | 4/2004 | Morano et al. |
| 2004/0083145 A1 | 4/2004 | Kobayashi et al. |
| 2005/0033735 A1 | 2/2005 | Shapiro |
| 2005/0054381 A1 | 3/2005 | Lee et al. |
| 2005/0144072 A1 | 6/2005 | Perkowski et al. |
| 2005/0160103 A1 | 7/2005 | Raffo |
| 2005/0210024 A1 | 9/2005 | Hurst-Hiller et al. |
| 2005/0246234 A1 | 11/2005 | Munyon |
| 2006/0075019 A1 | 4/2006 | Donovan et al. |
| 2006/0085306 A1 | 4/2006 | Schulte et al. |
| 2006/0085750 A1 | 4/2006 | Easton et al. |
| 2006/0122918 A1 | 6/2006 | Graboske et al. |
| 2006/0155632 A1 | 7/2006 | Cherkas et al. |
| 2006/0178961 A1 | 8/2006 | Stanley et al. |
| 2006/0184410 A1 | 8/2006 | Ramamurthy et al. |
| 2006/0271451 A1 | 11/2006 | Varughese |
| 2007/0011039 A1 | 1/2007 | Oddo |
| 2007/0033116 A1 | 2/2007 | Murray |
| 2007/0033117 A1 | 2/2007 | Murray |
| 2007/0226153 A1 | 9/2007 | Ziegler |
| 2008/0027979 A1 | 1/2008 | Chandrasekar et al. |
| 2008/0059900 A1 | 3/2008 | Murray et al. |
| 2008/0104045 A1 | 5/2008 | Cohen et al. |
| 2008/0119134 A1 | 5/2008 | Rao |
| 2008/0147494 A1 | 6/2008 | Larson |
| 2008/0189197 A1 | 8/2008 | Allanson et al. |
| 2008/0201206 A1 | 8/2008 | Pokorney et al. |
| 2008/0263643 A1 | 10/2008 | Jaiswal et al. |
| 2009/0076335 A1 | 3/2009 | Schwarzberg et al. |
| 2009/0099959 A1 | 4/2009 | Liao et al. |
| 2009/0307159 A1 | 12/2009 | Pinckney et al. |
| 2010/0010849 A1 | 1/2010 | Hurd |
| 2010/0017348 A1 | 1/2010 | Pinckney et al. |
| 2010/0023934 A1 | 1/2010 | Sheehan et al. |
| 2010/0063975 A1 | 3/2010 | Hayes |
| 2010/0262495 A1 | 10/2010 | Dumon et al. |
| 2010/0277429 A1 | 11/2010 | Day et al. |
| 2010/0332362 A1 | 12/2010 | Ramsey et al. |
| 2011/0004537 A1 | 1/2011 | Allanson et al. |
| 2011/0078066 A1 | 3/2011 | Sherman et al. |
| 2011/0119264 A1 | 5/2011 | Hu et al. |
| 2011/0137776 A1 | 6/2011 | Goad et al. |
| 2011/0173116 A1 | 7/2011 | Yan et al. |
| 2011/0264569 A1 | 10/2011 | Houseworth et al. |
| 2011/0307331 A1 | 12/2011 | Richard et al. |
| 2012/0030159 A1 | 2/2012 | Pilaszy et al. |
| 2012/0030767 A1 | 2/2012 | Rippert et al. |
| 2012/0053965 A1 | 3/2012 | Hellman et al. |
| 2012/0084185 A1 | 4/2012 | Ciaramitaro et al. |
| 2012/0084293 A1 | 4/2012 | Brown et al. |
| 2012/0109792 A1* | 5/2012 | Eftekhari ............... G06F 21/31 705/31 |
| 2012/0136764 A1 | 5/2012 | Miller et al. |
| 2012/0211561 A1 | 8/2012 | Lieberman et al. |
| 2012/0215669 A1* | 8/2012 | Lieberman ............ G06Q 40/123 705/31 |
| 2012/0278179 A1 | 11/2012 | Ray et al. |
| 2012/0303495 A1 | 11/2012 | Murray |
| 2012/0324393 A1 | 12/2012 | Mbenkum et al. |
| 2013/0080302 A1 | 3/2013 | Allanson et al. |
| 2013/0091050 A1 | 4/2013 | Merrill et al. |
| 2013/0103420 A1 | 4/2013 | Massoumi et al. |
| 2013/0124644 A1 | 5/2013 | Hunt et al. |
| 2013/0198047 A1 | 8/2013 | Houseworth et al. |
| 2013/0254151 A1 | 9/2013 | Mohagheghi et al. |
| 2013/0282733 A1 | 10/2013 | Tawakol et al. |
| 2013/0317957 A1 | 11/2013 | Reahard et al. |
| 2014/0027509 A1 | 1/2014 | Lieberman et al. |
| 2014/0058910 A1 | 2/2014 | Abeles |
| 2014/0074672 A1 | 3/2014 | Sarver |
| 2014/0075014 A1 | 3/2014 | Chourey |
| 2014/0101571 A1 | 4/2014 | Lewis |
| 2014/0156566 A1* | 6/2014 | Kabiljo ............... G06Q 30/02 706/12 |
| 2014/0172656 A1 | 6/2014 | Shaw |
| 2014/0180883 A1 | 6/2014 | Regan |
| 2014/0195461 A1 | 7/2014 | Fafard et al. |
| 2014/0201045 A1 | 7/2014 | Pai et al. |
| 2014/0207634 A1 | 7/2014 | Edmonds |
| 2014/0214636 A1 | 7/2014 | Rajsky |
| 2014/0222702 A1 | 8/2014 | Jennings |

(56) References Cited

U.S. PATENT DOCUMENTS

| | | | |
|---|---|---|---|
| 2014/0244455 | A1 | 8/2014 | Huang et al. |
| 2014/0244456 | A1 | 8/2014 | Huang et al. |
| 2014/0244457 | A1 | 8/2014 | Howell et al. |
| 2014/0279190 | A1 | 9/2014 | Severinghaus et al. |
| 2014/0279720 | A1 | 9/2014 | Bhatia et al. |
| 2014/0314225 | A1 | 10/2014 | Riahi et al. |
| 2014/0324648 | A1 | 10/2014 | Mori et al. |
| 2014/0325664 | A1 | 10/2014 | Nekhoroshev |
| 2014/0337189 | A1 | 11/2014 | Barsade et al. |
| 2014/0337527 | A1 | 11/2014 | Jain |
| 2014/0337753 | A1 | 11/2014 | McKellar et al. |
| 2014/0380179 | A1 | 12/2014 | Bose et al. |
| 2015/0007065 | A1 | 1/2015 | Krishnamoorthy et al. |
| 2015/0020091 | A1 | 1/2015 | Roberts et al. |
| 2015/0026146 | A1 | 1/2015 | Mance |
| 2015/0058188 | A1 | 2/2015 | Bartlett et al. |
| 2015/0099255 | A1 | 4/2015 | Aslan et al. |
| 2015/0112767 | A1 | 4/2015 | Shatzkamer et al. |
| 2015/0127813 | A1 | 5/2015 | Li et al. |
| 2015/0149877 | A1 | 5/2015 | Ling et al. |
| 2015/0178371 | A1 | 6/2015 | Seth et al. |
| 2015/0261859 | A1* | 9/2015 | Isensee ............... G06F 16/287 707/723 |
| 2015/0332167 | A1 | 11/2015 | Kaushal et al. |
| 2015/0363875 | A1 | 12/2015 | Guerry |
| 2016/0034853 | A1 | 2/2016 | Wang et al. |
| 2016/0063643 | A1 | 3/2016 | Martin |
| 2016/0063645 | A1* | 3/2016 | Houseworth ........ G06Q 40/123 705/31 |
| 2016/0078567 | A1 | 3/2016 | Goldman et al. |
| 2016/0092994 | A1 | 3/2016 | Roebuck et al. |
| 2016/0098804 | A1 | 4/2016 | Mascaro et al. |
| 2016/0125552 | A1 | 5/2016 | Pathak et al. |
| 2016/0148322 | A1 | 5/2016 | Mascaro et al. |
| 2016/0180470 | A1 | 6/2016 | Mascaro et al. |
| 2016/0217533 | A1 | 7/2016 | Laaser |
| 2016/0217534 | A1 | 7/2016 | Goldman et al. |
| 2016/0246762 | A1 | 8/2016 | Eaton |
| 2016/0247239 | A1 | 8/2016 | Houseworth et al. |
| 2016/0275627 | A1 | 9/2016 | Wang et al. |
| 2016/0292217 | A1 | 10/2016 | Sinha et al. |
| 2016/0306846 | A1 | 10/2016 | Adams, Jr. et al. |
| 2016/0328804 | A1 | 11/2016 | Mori et al. |
| 2016/0328805 | A1 | 11/2016 | Mori et al. |
| 2016/0328806 | A1 | 11/2016 | Mori et al. |
| 2016/0350870 | A1 | 12/2016 | Morin et al. |
| 2016/0364806 | A1 | 12/2016 | Lee |
| 2017/0004585 | A1 | 1/2017 | Dang et al. |
| 2017/0132314 | A1 | 5/2017 | Liu et al. |
| 2017/0147925 | A1* | 5/2017 | Bostick ............... G06Q 30/02 |

OTHER PUBLICATIONS

"Question & Answer Excerpt Regarding Microsoft Error Reports", dated Jan. 31, 2014; retrieved from the Internet Archive at https://superuser.com/questions/709161/what-happens-when-someone-sends-a-microsoft-error-report; retrieved from the internet Oct. 13, 2018.

Zhang, Zhenya, et al.; "Enabling Personalization Recommendation with WeightedFP for Text Information Retrieval Based on User-Focus," Proceedings of the International Conference on Information Technology: Coding and Computing (ITCC'04), 5 pp.

Forsati, R.; "Web Page Personalization Based on Weighted Association Rules," 2009 International Conference on Electronic Computer Technology, pp. 130-135.

Anders, B. Susan; "Website of the Month: MSN Money Tax Center," Apr. 2013, The CPA Journal, pp. 72-73.

"Modular Programming," Wikipedia, the free encyclopedia, Jul. 29, 2014, http://en.wikipedia.org/w/index.php?title=Modular_programming&oldid=618953117, retrieved from the Internet on Mar. 31, 2015, 4 pages.

Publication 559: Final Income Tax Return for Decedent—Form 1040, p. 2, paragraph 2; https://taxmap.ntis.gov/taxmap/pub/p559-001.htm; retrieved from the Internet Jul. 11, 2017.

Laaser et al., "Method and System for Applying Predictive Models to Reduce Task Abandonment by a User," U.S. Appl. No. 14/529,317, filed Oct. 31, 2014.

Laaser et al., "Identification of Electronic Tax Return Errors Based on Declarative Constraints," U.S. Appl. No. 14/530,305, filed Oct. 31, 2014.

Goldman et al., "Predictive Model Based Identification of Potential Errors in Electronic Tax Return," U.S. Appl. No. 14/530,369, filed Oct. 31, 2014.

Laaser et al., "Method and System for Identifying Product Defects Within a Tax Return Preparation System," U.S. Appl. No. 14/607,935, filed Jan. 28, 2015.

Laaser et al., "Method and System for Assisting Tax Return Preparers with the Preparation of Tax Returns for Client Tax Filers," U.S. Appl. No. 14/634,219, filed Feb. 27, 2015.

Cabrera et al., "Method and System for Providing a Personalized Recommendation for a Tax Return Preparer," U.S. Appl. No. 14/670,986, filed Mar. 27, 2015.

Laaser et al., "Methods, Systems and Computer Program Products for Calculating an Estimated Result of a Tax Return," U.S. Appl. No. 14/674,582, filed Mar. 31, 2015.

U.S. Appl. No. 60/608,035, dated Sep. 7, 2004, Quinn et al.

Laaser et al., "Systems for Identifying Abandonment Indicators for an Electronic Tax Return Preparation Program," U.S. Appl. No. 14/698,645, filed Apr. 28, 2015.

* cited by examiner

METHOD AND TECHNIQUE TO CALCULATE AND PROVIDE CONFIDENCE SCORE FOR PREDICTED TAX DUE/REFUND

BACKGROUND

Federal and State Tax law has become so complex that it is now estimated that each year Americans alone use over 6 billion person hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a potentially flexible, highly accessible, and affordable source of tax preparation assistance. However, some users of traditional tax return preparation systems can become confused or discouraged with aspects of traditional tax return preparation systems.

For instance, some traditional tax return preparation systems provide to the user a graphical representation of an estimated tax refund during the tax return preparation interview. As the user enters additional data during the tax return preparation interview, the estimated tax refund can undergo large changes. The estimated tax refund may initially be large before being changed to a large tax liability as further data is entered by the user. These large changes throughout the tax return preparation interview can be confusing and discouraging to the user. Additionally, if the user is expecting a large tax refund, but the initial estimated tax refund at the beginning of the tax return preparation interview indicates an expected tax liability or very small refund then the user can lose confidence in the tax return preparation system. Such problems may cause the user to decide to forgo the use of the traditional tax return preparation system in favor of other tax return preparation options.

What is needed is a method and system for providing a tax refund estimate in a manner that does not confuse or discourage the user.

SUMMARY

Embodiments of the present disclosure address some of the shortcomings associated with traditional tax return preparation systems by providing methods and systems for providing both estimated tax refund data and tax refund confidence indicator data to a user of a tax return preparation system. In particular, embodiments of the present disclosure analyze user current tax related data and present to the user an estimated tax refund and a confidence score indicating the likely accuracy of the estimated tax refund. The confidence score suggests to the user whether the estimated tax refund is likely to be accurate at the current stage of the tax return preparation interview. Thus, during the initial phases of the tax return preparation interview, the confidence score may suggest to the user that the estimated tax refund should not yet be relied upon until additional user current tax related data is received. As the user enters further user current tax related data, the confidence score may indicate that the current estimated tax refund is likely to be accurate. By providing to the user a confidence score indicating the likely reliability or accuracy of the estimated tax refund, the tax return preparation system reduces confusion and misunderstanding while increasing the user's confidence in the tax return preparation system.

In one embodiment, the tax return preparation system includes a user interface module that receives user current tax related data from a user of the tax return preparation system as part of a tax return preparation interview. The tax return preparation system includes a data acquisition module that gathers historical tax related data associated with previously prepared tax returns. The tax return preparation system also includes an analytics module that analyzes the user data and the previous tax data and generates estimated tax refund data and confidence score data based on the user data and the previous tax data. The user interface module then provides both the estimated tax refund data and the confidence score data to the user. The confidence score data indicates to the user whether or not the estimated tax refund data is likely to be accurate at the current stage of the tax return preparation interview.

In one embodiment, the tax return preparation system outputs the estimated tax refund data and the confidence score data in a graphical form to be displayed concurrently on a computing device of the user. The confidence score data can be presented as a percentage between 0% and 100% with lower percentages indicating low confidence in the current estimated tax refund data and higher percentages indicating higher confidence in the current estimated tax refund data. The confidence score data can also be presented as a number 0 and 1 with values approaching 0 representing no confidence and values approaching 1 representing complete confidence. The confidence score can also be presented as a bar graph with a shorter bar indicating low confidence and a longer bar indicating high confidence. The confidence score data can also be presented in the form of coloration of the estimated tax refund data with selected colors indicating low confidence and other selected colors indicating high confidence. The confidence score data can also be presented by displaying the estimated tax refund data as a range of dollar amounts (or other currency). A very wide range can indicate low confidence and a very narrow range can indicate high confidence. In various embodiments, the confidence score data can be presented to the user via any information conveyance mechanism as discussed herein, and/or as known in the art at the time of filing, and/or as developed after the time of filing. In one embodiment, the analytics module calculates the confidence score by analyzing the user current tax related data and the historical tax related data. In one embodiment, as the user enters user current tax related data the analytics module selects previously prepared tax returns that include historical tax related data similar to the user current tax related data entered so far. In one example, the analytics module can determine that previously prepared tax returns with characteristics similar to those of the user current tax related data commonly resulted in a large range of tax refund (or tax liability) amounts. The analytics module may determine that there is low confidence in the current estimated tax refund data, resulting in low confidence score data. In another example, the analytics module can determine that previously prepared tax returns with characteristics similar to those of the user current tax related data commonly resulted in tax refunds (or liability) within a narrow range and that the current estimated tax refund data also falls within that narrow range. The analytics module may then determine that there is high confidence in the current estimated tax refund data and may generate correspondingly high confidence score data.

The analytics module can analyze the user current tax related data and the historical tax related data according to one or more algorithms or analysis techniques. For example, the analytics module can base the confidence score data on mean tax refunds, median tax refunds, and standard deviations of tax refunds associated with previously prepared tax returns or a selected subset of previously prepared tax returns. The analytics module can base the estimated tax refund on z-scores computed from the historical tax related data. The analytics module can utilize a logistic function to generate the confidence score data. The analytics module may generate a confidence score based on observed or assumed distribution of tax refunds associated with the historical tax related data. The analytics module may generate a confidence score based on previously generated confidence scores for other estimated tax refunds. The analytics module may generate a confidence score based on Monte Carlo integration.

Systems and methods for generating estimated tax refund data are discussed in greater detail in U.S. patent application Ser. No. 14/674,582, filed Mar. 31, 2015 and incorporated by reference herein.

In one embodiment, the tax return preparation system includes a plurality of interchangeable analytics modules and an analytics module selection engine. The analytics module selection engine selects the analytics module from among the interchangeable analytics modules based on the currently received user current tax related data. The analytics module selection engine can select a different analytics module from the interchangeable analytics modules based on particular circumstances. The tax return preparation system then uses the selected analytics module to generate the confidence score data.

In one embodiment, the analytics module calculates the confidence score in a similar algorithm or method as the algorithm or method used to calculate the estimated tax refund data. A single analytics module can also include separate engines for calculating the estimated tax refund data and the confidence score data.

In one embodiment, the analytics module calculates the estimated tax refund data and the confidence score data analyzing historical tax related data. For example, the analytics module can calculate the estimated tax refund data and the confidence score data based solely on the user current tax related data and current tax law. Alternatively, the historical tax related data can include tax law data.

In one embodiment, the data acquisition module gathers historical tax related data or other financial or personal data from one or more government databases, third-party databases, social media databases, or other databases. The analytics module generates the estimated tax refund data and/or the confidence score data based on the user current tax related data and the other financial or personal data. In one embodiment, the historical tax related data includes financial or personal data gathered from the one or more government databases, third-party databases social media databases, or other databases.

Embodiments of the present disclosure address some of the shortcomings associated with traditional tax return preparation systems that do not adequately prepare a user to analyze an estimated tax refund. A tax return preparation system in accordance with one or more embodiments provides confidence to a user by providing both an estimated tax refund and a tax refund confidence indicator to the user of a tax return preparation system by gathering and analyzing user current tax related data associated with the user and historical tax related data. The various embodiments of the disclosure can be implemented to improve the technical fields of user experience, services marketing, data collection, and data processing. Therefore, the various described embodiments of the disclosure and their associated benefits amount to significantly more than an abstract idea. In particular, by generating an estimated tax refund and a confidence score and providing them to the user, users can save money and time and can better manage their wealth and taxes.

Using the disclosed embodiments of a method and system for providing both an estimated tax refund and a tax refund confidence indicator to a user of a tax return preparation system, a method and system for providing both an estimated tax refund and a tax refund confidence indicator to a user of a tax return preparation system more accurately is provided. Therefore, the disclosed embodiments provide a technical solution to the long standing technical problems of providing and updating an estimated tax refund in real time during a tax return preparation interview while also reducing confusion and increasing confidence by providing the user of the tax return preparation system with information as to how the current estimated tax refund should be regarded by the user.

In addition, the disclosed embodiments of a method and system for providing both an estimated tax refund and a tax refund confidence indicator to a user of a tax return preparation system are also capable of dynamically adapting to the needs of users in preparing the tax return. Consequently, the disclosed embodiments of a method and system for providing both an estimated tax refund and a tax refund confidence indicator to a user of a tax return preparation system also provide a technical solution to the long standing technical problem of static and inflexible financial document preparation systems.

The result is a much more accurate, adaptable, and robust, method and system to providing both an estimated tax refund and a tax refund confidence indicator to a user of a tax return preparation system, but thereby serves to bolster confidence in electronic financial document preparation. This, in turn, results in: less human and processor resources being dedicated to analyzing electronic financial documents because more accurate and efficient analysis methods can be implemented, i.e., fewer processing and memory storage assets; less memory and storage bandwidth being dedicated to buffering and storing tax return preparation documents; less communication bandwidth being utilized to transmit previously prepared tax returns or other financial documents or data for analysis.

The disclosed method and system for providing both an estimated tax refund and a tax refund confidence indicator to a user of a tax return preparation system does not encompass, embody, or preclude other forms of innovation in the area of tax return preparation. In addition, the disclosed method and system for providing both an estimated tax refund and a tax refund confidence indicator to a user of a tax return preparation system is not related to any fundamental economic practice, fundamental data processing practice, mental steps, or pen and paper based solutions, and is, in fact, directed to providing solutions to new and existing problems associated with tax return preparation systems. Consequently, the disclosed method and system for providing both an estimated tax refund and a tax refund confidence indicator to a user of a tax return preparation system, does not encompass, and is not merely, an abstract idea or concept.

Figure 1:
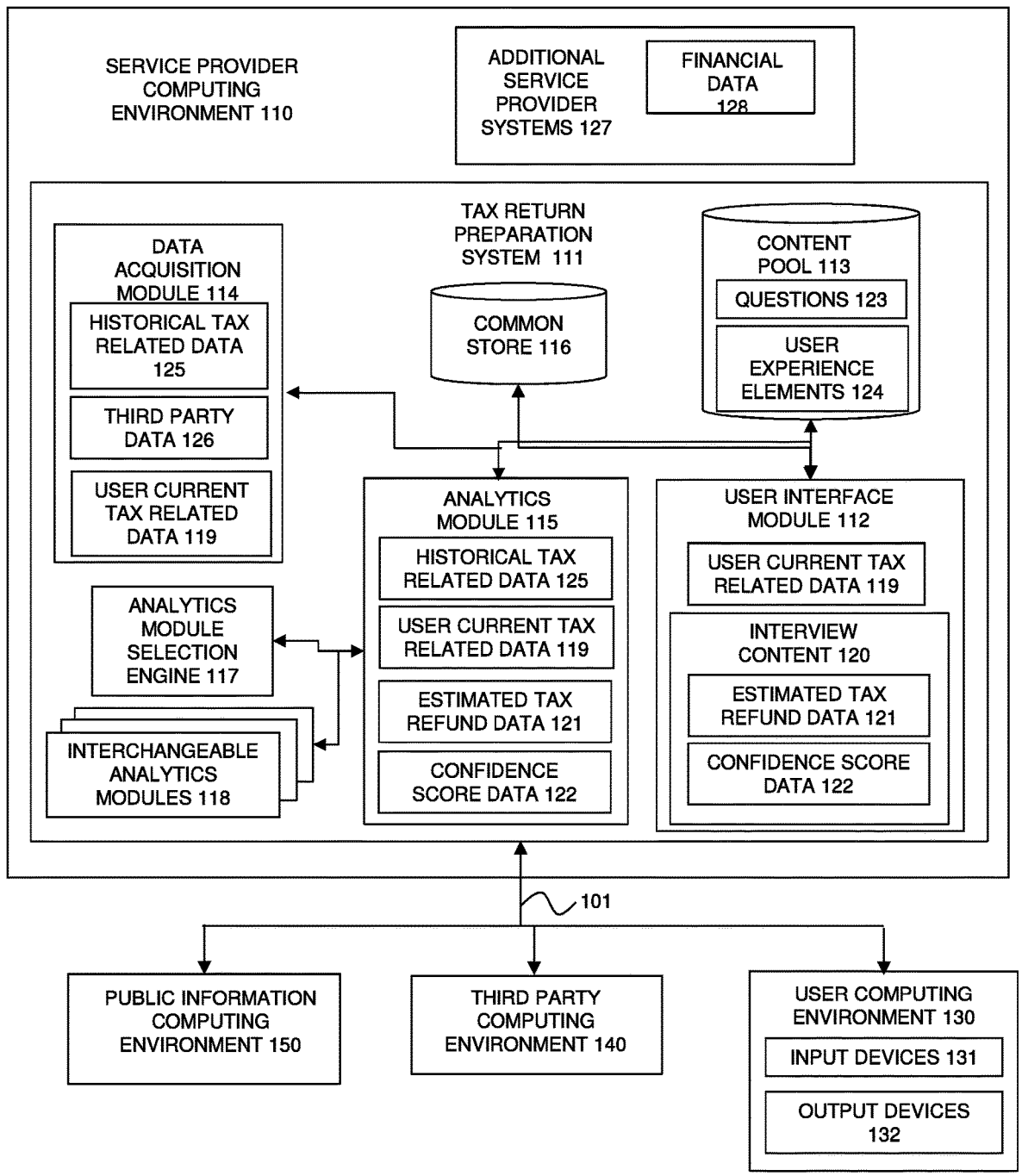
FIG. 1 is a block diagram of software architecture for providing both an estimated tax refund and a tax refund confidence score to a user of a tax return preparation system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed tax return preparation system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the terms "interview" and "interview process" include, but are not limited to, an electronic, software-based, and/or automated delivery of multiple questions to a user and an electronic, software-based, and/or automated receipt of responses from the user to the questions, according to various embodiments.

Hardware Architecture

FIG. 1 illustrates a block diagram of a production environment 100 for providing both an estimated tax refund and a tax refund confidence indicator to a user of a tax return preparation system, according to one embodiment. Embodiments of the present disclosure provide methods and systems for providing both an estimated tax refund and a tax refund confidence indicator to a user of a tax return preparation system, according to one embodiment. In particular, embodiments of the present disclosure analyze user current tax related data and historical tax related data to generate both estimated tax refund data and confidence score data indicating a level of confidence in the estimated tax refund data. By providing both the estimated tax refund data and the confidence score data to the user, user confidence in the tax return preparation system is increased.

In addition, the disclosed method and system for providing both an estimated tax refund and a tax refund confidence indicator to a user of a tax return preparation system provides for significant improvements to the technical fields of electronic transaction data processing, data processing, data management, and user experience.

In addition, as discussed above, the disclosed method and system for providing both an estimated tax refund and a tax refund confidence indicator to a user of a tax return preparation system provides for the processing and storing of smaller amounts of data, i.e., more efficiently analyze historical tax related data to generate estimated tax refund data and confidence score data; thereby eliminating unnecessary data analysis and storage. Consequently, using the disclosed method and system for providing both an estimated tax refund and a tax refund confidence indicator to a user of a tax return preparation system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for providing both an estimated tax refund and a tax refund confidence indicator to a user of a tax return preparation system.

The production environment 100 includes a service provider computing environment 110, a user computing environment 130, a public information computing environment 150, and a third party computing environment 140 for providing both an estimated tax refund and a tax refund confidence indicator to a user of a tax return preparation system, according to one embodiment. The computing environments 110, 130, 140, and 150 are communicatively coupled to each other with one or more communication channels 101, according to one embodiment.

The service provider computing environment 110 represents one or more computing systems such as a server, a computing cabinet, and/or distribution center that is configured to receive, execute, and host one or more tax return preparation systems (e.g., applications) for access by one or more users, for providing both an estimated tax refund and a tax refund confidence indicator to a user of a tax return preparation system, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a tax return preparation system 111, which is configured to providing both an estimated tax refund and a tax refund confidence indicator to a user.

According to one embodiment, the tax return preparation system 111 is a personal financial management system. More particularly, the tax return preparation system 111 can be a tax return preparation system or a system that manages one or more of banking, investments, loans, credit cards, real estate investments, retirement planning, and budgeting. The tax return preparation system 111 can be a standalone system that provides both an estimated tax refund and a tax refund confidence indicator to a user. Alternatively, the tax return preparation system 111 can be integrated into other software or service products provided by a service provider.

The tax return preparation system 111 receives user current tax related data from a user, gathers historical tax related data related to previously prepared tax returns, and generates estimated tax refund data and confidence score data based on the user current tax related data and the historical tax related data, according to one embodiment. The tax return preparation system 111 includes various components, databases, engines, modules, and/or data to support providing both an estimated tax refund and a tax refund confidence indicator to a user, according to one embodiment.

The tax return preparation system 111 includes a user interface module 112, a data acquisition module 114, and an analytics module 115, according to one embodiment.

The user interface module 112 guides a user through a tax return preparation interview by guiding the user through a series of financial topics by asking questions or by inviting the user to provide data related to financial topics selected by the user. The user interface module 112 provides both estimated tax refund data 121 and a tax refund confidence score 122 to the user, at least partially based on the data provided by the user in relation to the financial topics, according to one embodiment. The user interface module 112 receives user current tax related data 119 in response to providing interview content 120, according to one embodiment. The user interface module 112 populates interview content 120 from a content pool 113, which includes a number of questions 123 and/or financial topics that can be presented with one or more user experience elements 124, according to one embodiment. The user experience elements 124 include, but are not limited to, buttons, slides, dialog boxes, text boxes, drop-down menus, banners, tabs, directory trees, links, audio content, video content, and/or other multimedia content for receiving user current tax related data 119 from the user computing environment 130 and for providing questions, and both an estimated tax refund and a tax refund confidence indicator to the user computing environment 130, according to one embodiment.

The user computing environment 130 includes input devices 131 and output devices 132 for communicating with the user, according one embodiment. The input devices 131 include, but are not limited to, keyboards, mice, microphones, touchpads, touchscreens, digital pens, and the like. The output devices 132 include, but are not limited to, speakers, monitors, touchscreens, and the like. The output devices 132 can display the estimated tax data 121 and the confidence score data 122 to the user.

Returning to the tax return preparation system 111, the user interface module 112 is configured to receive the user current tax related data 119 from the user, according to one embodiment. The user current tax related data 119 includes information, such as, but not limited to, a name of the user, a name of the user's employer, an employer identification number (EID), a job title, annual income, salary and wages, bonuses, a Social Security number, a government identification, a driver's license number, a date of birth, an address, a zip code, home ownership status, marital status, W-2 income, an employer's address, spousal information, children's information, asset information, medical history, occupation, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a tax return preparation system or in the preparation of financial documents such as a user's tax return, according to various embodiments.

The data acquisition module 114 is configured to acquire additional information from various sources to merge with or supplement the user current tax related data 119, according to one embodiment. For example, the data acquisition module 114 is configured to gather from various sources historical tax related data 125 and third party data 126. For example, the data acquisition module 114 is configured to communicate with additional service provider systems 127, e.g., a tax return preparation system, a payroll management system, or other financial management system, to access financial data 128, according to one embodiment. The data acquisition module 114 imports relevant portions of the financial data 128 into the tax return preparation system 111 and, for example, saves local copies into one or more databases, according to one embodiment.

According to one embodiment, the data acquisition module 114 can obtain some or all of the historical tax related data 125 from the common store 116. The common store 116 can include one or more databases in which historical tax related data is stored. The common store 116 can also store other data that can supplement the historical tax related data 125 acquired by the data acquisition module 114.

The data acquisition module 114 is configured to acquire additional financial data from the public information computing environment 150, according to one embodiment. The historical tax related data 125 can be gathered from public record searches of tax records, public information databases, property ownership records, and other public sources of information. The data acquisition module 114 can also acquire data from sources such as social media websites, such as Twitter, Facebook, LinkedIn, and the like.

The data acquisition module 114 is configured to acquire data from third parties, according to one embodiment. For example, the data acquisition module 114 requests and receives third party data 126 from the third party computing environment 140 to supply or supplement the historical tax related data 125, according to one embodiment. In one embodiment, the third party computing environment 140 is configured to automatically transmit financial data to the tax return preparation system 111 (e.g., to the data acquisition module 114), to be merged into historical tax related data 125. The third party computing environment 140 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

The tax return preparation system 111 is configured to analyze the user current tax related data 119 and historical tax related data 125, in order to provide both an estimated tax refund and a tax refund confidence indicator to the user. The tax return preparation system 111 uses the data acquisition module 114 to acquire the user current tax related data 119 and the historical tax related data 125, according to one embodiment. The data acquisition module 114 is configured to request and receive financial and personal information from the additional service provider systems 127, from the public information computing environment 150, and from the third party computing environment 140, according to various embodiments.

In one embodiment, the additional service provider systems 127 include a tax return preparation system, and the data acquisition module 114 is configured to acquire historical tax related data 125, for use by the tax return preparation system 111 in providing financial guidance to the user, according to one embodiment. Because the services provider provides both the tax return preparation system 111 and, for example, the additional service provider systems 127, the service provider computing environment 110 can be configured to share tax-related information between the various systems. By interfacing with the additional service provider systems 127, the data acquisition module 114 can collect historical tax related data 125. The financial data 128 can include income data, investment data, property ownership data, retirement account data, age data, data regarding additional sources of income, marital status, number and ages of children or other dependents, geographic location, and other data that indicates personal and financial characteristics of previous tax filers or user of other financial systems, according to one embodiment.

In one embodiment, the additional service provider systems 127 include a payroll system that manages the payroll of a large number of employers. The data acquisition module 114 is configured to acquire information from the financial data 128, for use by the tax return preparation system 111 in providing financial document preparation assistance to the user, according to one embodiment. Since the financial services provider provides both the tax return preparation system 111 and the payroll system, the service provider computing environment 110 can be configured to share financial data 128 between the various systems. By interfacing with the additional service provider systems 127, the data acquisition module 114 acquires financial data 128. The information can include income data, salary data, geographic location data, numbers of exemptions claimed, length of tenure with the employer, banking data, withholding data, investment data, and other types of data that indicate financial and personal characteristics of the employees of the employer.

The additional service provider systems 127 can include financial services other than payroll and tax return preparation systems. For example, the additional service provider systems can include personal financial management systems that manage one or more of banking, investments, credit cards, loans, retirement accounts, budgeting, or financial interests. The information acquisition module 111 can gather financial data from databases associated with the additional service provider systems 127.

The tax return preparation system 111 uses the analytics module 115 to analyze the user current tax related data 119 and the historical tax related data 125 in order to generate tax refund estimate data 121 and confidence score data 122. In particular, the analytics module 115 can analyze the user current tax related data 119 and the historical tax related data 125 in order to calculate the estimated tax refund data 121 and the confidence score data 122. The confidence score data 122 provides an indication of how reliable or accurate the estimated tax refund data 121 is. The estimated tax refund data 121 and the confidence score data 122 are provided to the user of the tax return preparation system 111 via the user interface module 112. The analytics module 115 thus generates both estimated tax refund data and confidence score data so that the user of the tax return preparation system 111 can understand how accurate the estimated refund data is likely to be.

When preparing an electronic tax return, a user typically enters data into various data-entry fields. For example, typically the user will enter user current tax related data 119 indicating personal and financial characteristics as part of the tax return preparation interview. Such personal information can include a street address, a date of birth, gender, job title, number of children, marital status, social security number, education, name of employer, and many other types of fields. The financial data can include gross income, net income, taxes withheld, medical expenses, capital gains, charitable donations, home purchases or sales, business ownership, business profits and losses, investments, and many other types of financial data.

The analytics module 115 generates estimated tax refund data 121 corresponding to an estimated dollar amount (or other currency) of a tax refund the user can expect based on the user current tax related data 119. At an early stage of the tax return preparation interview, the analytics module 115 may generate estimated tax refund data 121 based on relatively little user current tax related data 119. The analytics module 115 causes the estimated tax refund data 121 to be output to the user via the user interface module 112. Because the estimated tax refund data 121 is based on relatively little user current tax related data 119, it is likely that the estimated tax refund data 121 will change dramatically as further user current tax related data 119 is entered by the user.

In traditional tax return preparation systems, displaying an estimated refund can cause problems for the user. For example, during a tax return preparation interview in a traditional tax return preparation system, the user may first enter W-2 information and the traditional tax return preparation system may estimate a refund based only on the W-2 data. At this early stage of the tax return preparation interview the traditional tax return preparation system may estimate that a large tax liability will be due instead of a refund, based on the limited user current tax related data. If the user was expecting to receive a refund, the user may suspect that the traditional tax return preparation systems is deficient and may decide to abandon the traditional tax return preparation system in favor of other types of tax return preparation assistance. In another example, the traditional tax return preparation system may initially indicate a large tax refund is due. However, after further user current tax related data is entered the traditional tax return preparation system may then indicate that the user has a large tax liability. After yet further user current tax related data is entered, the traditional tax return preparation system may again indicate that a refund is due. Such dramatic changes in the estimated refund (or liability) may cause the user to become confused and/or lose confidence in the traditional tax return preparation system. The user may then decide to abandon the traditional tax return preparation system.

A tax return preparation system in accordance with principles of the present disclosure uses the analytics module 115 to overcome the deficiencies of traditional tax return preparation systems by generating both estimated tax refund data 121 and confidence score data 122. The confidence score data 122 provides an indication to the user of how seriously the user should take the current estimated tax refund data 121. In an example in which a user expects a large tax refund, but the tax refund data 121 initially indicates a large tax liability, the confidence score data 122 can indicate to the user that the user should ignore the current estimated tax refund data 121 because it is likely that the current estimated tax refund data 121 is not accurate. Thus, the user can ignore the estimated tax refund data 121 as the user continues to enter further user current tax related data 119. As the user enters further user current tax related data 119, the analytics module 115 updates the estimated tax refund data 121 and the confidence score data 122. At a later point in the tax return preparation interview the confidence score data 122 may indicate that the current estimated tax refund data 121 is most likely close to what the final tax refund data 121 will be at the end of the tax return preparation interview. As the updated estimated tax refund data 121 may accord with the user's expectation of a large refund, the user may gain confidence in both the estimated tax refund data 121 and the tax return preparation system 111 in general. In this way, the tax return preparation system 111 utilizes the analytics module 115 to overcome some of the deficiencies of traditional tax return preparation systems.

In one embodiment, the analytics module 115 generates the estimated tax refund data 121 by utilizing a predictive model. The predictive model can include an algorithm using modeling techniques selected from the group including logistic regression, naïve bays, K means classification, K means clustering, other clustering techniques, K nearest neighbor, neural networks, decision trees, random forests, boosted trees, k-nn classification, kd trees, generalized linear models, support vector machines, and substantial equivalents thereof. The analytics module 115 can also utilize other suitable techniques for generating the estimated tax refund data 121. The analytics module 115 can generate the tax refund data by analyzing the user current tax related data 119 alone, or by analyzing the user current tax related data 119 and the historical tax related data 125. The historical tax related data 125 that is analyzed in generating the estimated tax refund data 121 can include a large number of previously prepared tax returns, a selected subset of previously prepared tax returns that share selected characteristics with the user current tax related data 119, tax law data, financial or personal data gathered from the additional service provider is 127, the public information computing environment 150, and a third party computing environment 140. In these or other ways, the analytics module 115 can generate estimated tax refund data 121, according to an embodiment.

In one embodiment, the analytics module 115 uses a similar technique to generate a confidence score data 122 as is used to generate the estimated tax refund data 121. Thus, the analytics module 115 can use the same or similar model, algorithm, or set of algorithms to generate the confidence score data 122 as is used to generate the estimated tax refund data 121. The analytics module 115 can generate the confidence score data 122 based on the user current tax related data 119 and/or the historical tax related data 125 similar to the method used to generate the estimated tax refund data 121.

In one embodiment, the analytics module 115 generates the confidence score data 122 by analyzing, from the historical tax related data 125, previously prepared tax returns for other tax filers with similar characteristics. For example, if the system only has access to the tax filers filing status, occupation, and W2 wages the estimate may be calculated by analyzing other tax filers with the same filing status, same occupation, and similar wages within a selected range. In this case, the estimate may be the mean refund for the cohort of similar filers. The analytics module 115 would then generate the confidence score data 122 as a function of the z-score. In some situations it is sufficient to just use the z-score as is for the confidence score data 122. In other situations, such as when it is desired to indicate a high confidence, the inverse of the z-score may be used. In yet other situations such as when the confidence score data 122 is desired to be between 0.0 and 1.0, some version of the logistic function may be used.

In one embodiment, the analytics module 115 applies a function to the user current tax related data 119 and/or the historical tax related data 125 before the mean and standard deviation is calculated to produce the z-score. This is because the z-score calculation described above is particularly useful when the data is normally distributed. In practice, tax data is observed to be better described by a log-normal distribution. In this case, the mean and standard deviation of the log of the user current tax related data 119 and/or the historical tax related data 125 is a good choice to calculate the z-score. For example, after the analytics module 115 selects previously prepared tax returns to be analyzed based on similarities with the user current tax related data 119, the analytics module 115 calculates the z-score by calculating the mean and standard deviation of the log of the tax refunds associated with the selected previously prepared tax returns.

In one embodiment, the analytics module 115 calculates the confidence score 122 based on the believed distribution of the historical tax related data 125. For example, if the underlying data is believed to be exponentially distributed, then a z-score may not be a particularly good estimate for the confidence score data 122. In this case, the confidence interval may provide better confidence score data 122. Other common distributions can include binomial, gamma, and poison distributions, among others. Thus, the analytics module 115 can use a method for calculating the confidence score 122 based on the actual or believed distribution of the historical tax related data 125.

In one embodiment, if the distribution of the historical tax related data 125 is not known, the analytics module 115 can calculate the confidence score 122 by analyzing the decile of the historical tax related data 125. For example, the analytics module 115 can calculate confidence score 122 by calculating the difference the difference between the 40% percentile and the 60% percentile.

In one possible embodiment, the analytics module 115 can generate the confidence score 122 based on an entire population of previously prepared tax returns instead of a subset of selected previously prepared tax returns based on shared characteristics with the user current tax related data 119.

In one embodiment, the analytics module 115 calculates the estimated tax refund data 121 based on other estimated values. For example, the estimated tax refund data 121 (corresponding to line 63 on form 1040) is calculated by subtracting total payments (line 74 on form 1040) from total tax (line 63 on form 1040). In this case, the confidence score 122 for the estimated tax refund data 121 is calculated from the confidence score of other estimated values. In one example, when estimated tax refund data 121 is calculated from other estimated values, and if the distribution of the input estimated values is known, then the distribution of the final estimate may be calculated from the distributions of the two input estimates. For example, if the total tax (line 63 on form 1040) and tax payments (line 74 on form 1040) are known to be normally distributed, then the refund (line 75 on form 1040) will also be normally distributed. Furthermore, the mean and standard deviation of the refund can be calculated from the mean and standard deviation of the total tax and total payments. The confidence score 122 may then be calculated from the mean and standard deviation.

In one example, a user accesses the tax return preparation system 111 and enters user current tax related data 119 that includes fields of a W-2 form indicating that the user is a high school teacher from Denver, Colo. with a gross income of $50,000, in addition to other financial and personal data. The analytics module 115 generates estimated tax refund data 121 based on the user current tax related data 119 entered by the user so far and the historical tax related data 125. The analytics module 115 also accesses historical tax related data 125 and selects a set of previously prepared tax returns corresponding to high school teachers from Denver, Colo. with a gross income in the range of $40,000-$60,000. The analytics module 115 may then use a selected model, algorithm, or set of algorithms as described above to determine that the majority of tax refunds associated with this subset of previously prepared tax returns falls within a particular narrow range. If the estimated tax refund data 121 also falls within the narrow range, the analytics module 115 may determine that the estimated tax refund data 121 is fairly likely to be accurate and may generate a confidence score 122 that indicates to the user that the tax refund data 121 is fairly likely to be accurate. Because the analytics module 115 understands that comparatively little user current tax related data 119 is received so far, the analytics module 115 does not generate a confidence score 122 data that indicates high confidence despite the alignment of the estimated tax refund data 121 with the majority of tax refunds associated with high school teachers from Denver, Colo. having a similar income. The confidence score data 122 may include or may be accompanied by text or other graphical representations that specifically advise the user to pay little heed, to pay moderate heed, or to pay great heed to the estimated tax refund data 121, as the case may be.

In one embodiment, the tax return preparation system outputs the estimated tax refund data and the confidence score data in a graphical form to be displayed on a computing device of the user. The confidence score data can be presented as a percentage between 0% and 100% with lower percentages indicating low confidence in the current estimated tax refund data and higher percentages indicating higher confidence in the current estimated tax refund data. The confidence score can also be presented as a number 0 and 1 with 0 representing no confidence and 1 representing complete confidence. The confidence score can also be presented as a bar graph with a shorter bar indicating low confidence and a longer bar indicating high confidence. The confidence score data can also be presented in the form of coloration of the estimated tax refund data with selected colors indicating low confidence and other selected colors indicating high confidence. The confidence score data can also be presented by displaying the estimated tax refund data as a range of dollar amounts (or other currency). A very large range can indicate low confidence, a very narrow range can indicate high confidence.

In one embodiment, the analytics module 115 calculates the confidence score by analyzing the user current tax related data 119 and the historical tax related data 125. In particular, as the user enters user current tax related data 119, the analytics module 115 selects previously prepared tax returns that include data similar to the user current tax related data 119 entered so far. For example, the analytics module 115 can determine that previously prepared tax returns with characteristics similar to those of the user current tax related data commonly resulted in a large range of tax refund (or tax liability) amounts. The analytics module may determine that there is low confidence in the current estimated tax refund data, resulting in low confidence score data. In another example, the analytics module can determine that previously prepared tax returns with characteristics similar to those of the user current tax related data commonly resulted in tax refunds (or liability) within a narrow range and that the current estimated tax refund data also falls within that narrow range. The analytics module may determine that there is high confidence in the current estimated tax refund data and may generate correspondingly high confidence score data.

In one embodiment, the tax return preparation system includes a plurality of interchangeable analytics modules 118 and an analytics module selection engine 117. The analytics module selection engine 117 selects the analytics module 115 from among the interchangeable analytics modules 118 based on the currently received user current tax related data 119. The analytics module selection engine 117 can select a different analytics module from the interchangeable analytics modules based on particular circumstances. The tax return preparation system 111 then uses the selected analytics module 115 to generate the estimated tax refund data 121 and confidence score data 122.

In one embodiment, the analytics module 115 calculates the estimated tax refund data 121 and the confidence score data 122 by analyzing historical tax related data. For example, the analytics module 115 can calculate the estimated tax refund data 121 and the confidence score data 122 based solely on the user current tax related data 119 and current tax law. The historical tax related data 125 can include tax law data.

In one embodiment, the data acquisition module 114 gathers historical tax related data 125 or other financial or personal data from one or more government databases, third-party databases, social media databases, or other databases. The analytics module 115 generates the estimated tax refund data 121 and/or the confidence score data 122 based on the user current tax related data 119 and the other financial or personal data. In one embodiment, the historical tax related data 125 includes financial or personal data gathered from the one or more government databases, third-party databases social media databases, or other databases.

Embodiments of the present disclosure address some of the shortcomings associated with traditional tax return preparation systems that do not adequately prepare a user to analyze an estimated tax refund. A tax return preparation system in accordance with one or more embodiments provides confidence to a user by providing both an estimated tax refund and a tax refund confidence indicator to the user of a tax return preparation system by gathering and analyzing user current tax related data associated with the user and historical tax related data. The various embodiments of the disclosure can be implemented to improve the technical fields of user experience, services marketing, data collection, and data processing. Therefore, the various described embodiments of the disclosure and their associated benefits amount to significantly more than an abstract idea. In particular, by generating an estimated tax refund and a confidence score and providing them to the user, users can save money and time and can better manage their wealth and taxes.

Process

Figure 2:
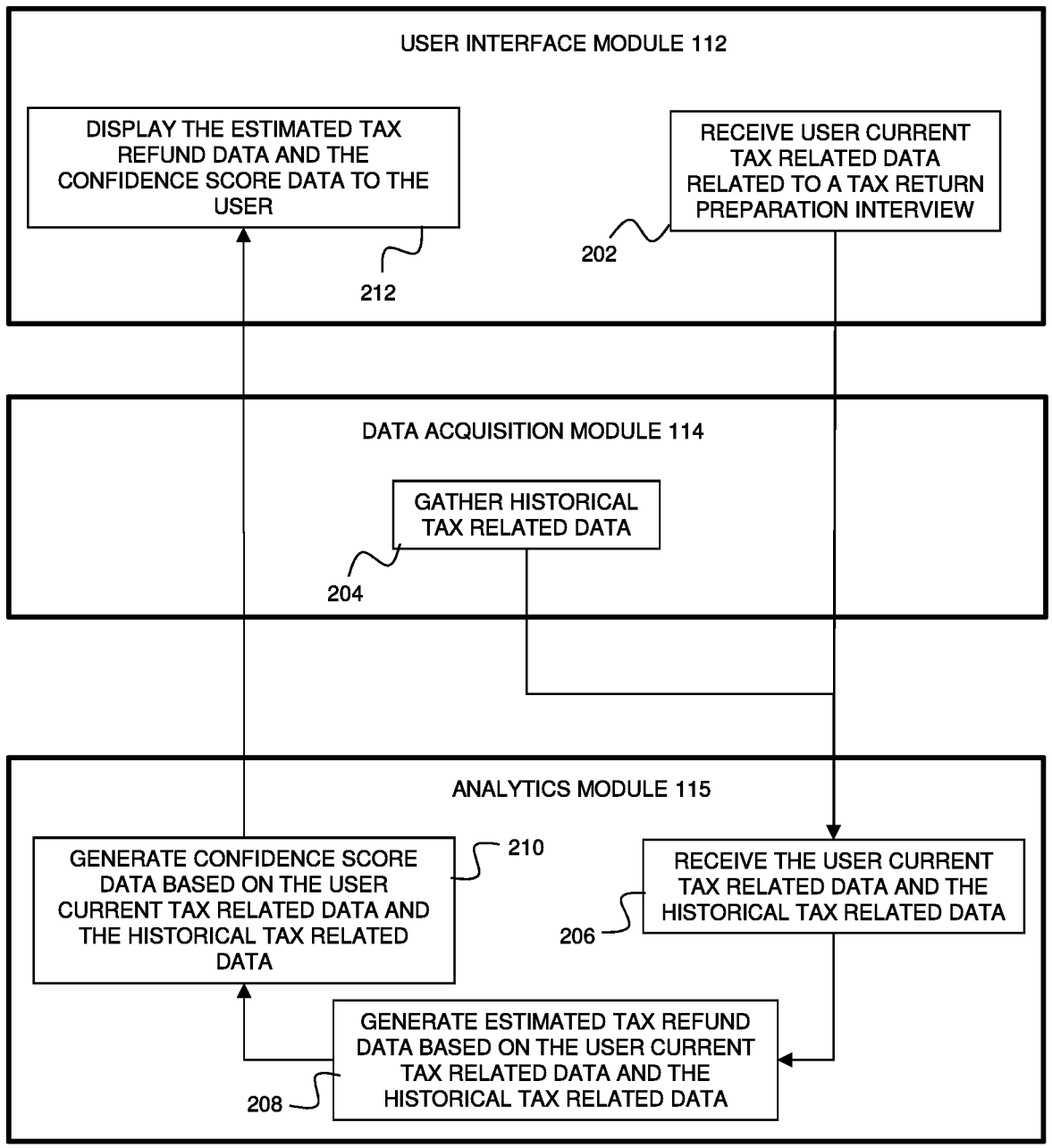
FIG. 2 is a block diagram of a process for providing both an estimated tax refund and a tax refund confidence score to a user of a tax return preparation system, in accordance with one embodiment.

FIG. 2 illustrates a functional flow diagram of a process 200 for providing an estimated tax refund confidence indicator to a user of a tax return preparation system, in accordance with one embodiment.

At block 202, the user interface module 112 receives user current tax related data from the user in relation to a tax return preparation interview, according to one embodiment.

At block 204, the data acquisition module 114 receives historical tax related data related to previously prepared tax returns. From block 204, the process proceeds to block 206.

At block 206, the analytics module 115 receives the user current tax related data and the historical tax related data, according to one embodiment. From block 206, the process proceeds to block 208.

At block 208, the analytics module 115 generates estimated tax refund data based on the user current tax related data and the historical tax related data, according to one embodiment. From block 208, the process proceeds to block 210.

At block 210, the analytics module 115 generates confidence score data based on the user current tax related data and the historical tax related data. From block 210, the process proceeds to block 212.

At block 212, the user interface module 112 displays the estimated tax refund data and the confidence score data to the user, according to one embodiment.

Although a particular sequence is described herein for the execution of the process 200, other sequences can also be implemented.

Figure 3:
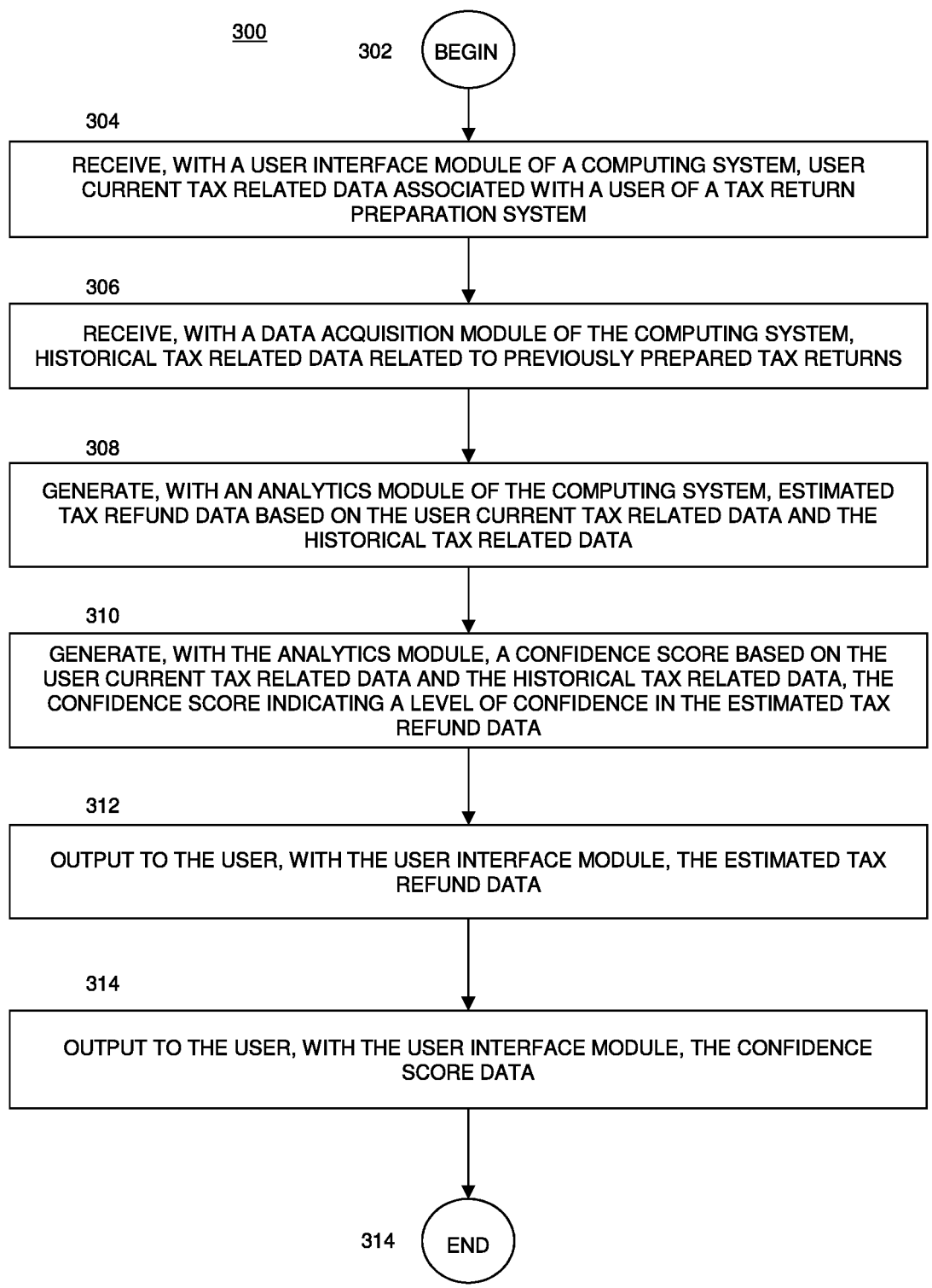
FIG. 3 is a flow diagram of a process for providing both an estimated tax refund and a tax refund confidence score to a user of a tax return preparation system, in accordance with one embodiment.

FIG. 3 illustrates a flow diagram of a process 300 for providing a tax refund confidence indicator to a user of a tax return preparation system, according to various embodiments.

In one embodiment, process 300 for providing a tax refund confidence indicator to a user of a tax return preparation system begins at BEGIN 302 and process flow proceeds to RECEIVE, WITH A USER INTERFACE MODULE OF A COMPUTING SYSTEM, USER CURRENT TAX RELATED DATA ASSOCIATED WITH A USER OF A TAX RETURN PREPARATION SYSTEM 304.

In one embodiment, at RECEIVE, WITH A USER INTERFACE MODULE OF A COMPUTING SYSTEM, USER CURRENT TAX RELATED DATA ASSOCIATED WITH A USER OF A TAX RETURN PREPARATION SYSTEM 304 process 300 for providing a tax refund confidence indicator to a user of a tax return preparation system receives, with a user interface module of a computing system, user current tax related data associated with a user of a tax return preparation system.

In one embodiment, once process 300 for providing a tax refund confidence indicator to a user of a tax return preparation system receives, with a user interface module of a computing system, user current tax related data associated with a user of a tax return preparation system at RECEIVE, WITH A USER INTERFACE OF A COMPUTING SYSTEM, USER CURRENT TAX RELATED DATA ASSOCIATED WITH A USER OF A TAX RETURN PREPARATION SYSTEM 304 process flow proceeds to RECEIVE, WITH A DATA ACQUISITION MODULE OF THE COMPUTING SYSTEM, HISTORICAL TAX RELATED DATA RELATED TO PREVIOUSLY PREPARED TAX RETURNS 306.

In one embodiment, at RECEIVE, WITH A DATA ACQUISITION MODULE OF THE COMPUTING SYSTEM, HISTORICAL TAX RELATED DATA RELATED TO PREVIOUSLY PREPARED TAX RETURNS 306, process 300 for providing a tax refund confidence indicator to a user of a tax return preparation system receives, with a data acquisition module of the computing system, historical tax related data related to previously prepared tax returns.

In one embodiment, once process 300 for providing a tax refund confidence indicator to a user of a tax return preparation system receives, with a data acquisition module of the computing system, historical tax related data related to previously prepared tax returns at RECEIVE, WITH A DATA ACQUISITION MODULE OF THE COMPUTING SYSTEM, HISTORICAL TAX RELATED DATA RELATED TO PREVIOUSLY PREPARED TAX RETURNS 306, process flow proceeds to GENERATE, WITH AN ANALYTICS MODULE OF THE COMPUTING SYSTEM, ESTIMATED TAX REFUND DATA BASED ON THE USER CURRENT TAX RELATED DATA AND THE HISTORICAL TAX RELATED DATA 308.

In one embodiment, at GENERATE, WITH AN ANALYTICS MODULE OF THE COMPUTING SYSTEM, ESTIMATED TAX REFUND DATA BASED ON THE USER CURRENT TAX RELATED DATA AND THE HISTORICAL TAX RELATED DATA 308, process 300 for providing a tax refund confidence indicator to a user of a tax return preparation system generates, with an analytics module of the computing system, estimated tax refund data based on the user current tax related data and the historical tax related data, according to one embodiment.

In one embodiment, once process 300 for providing a tax refund confidence indicator to a user of a tax return preparation system generates, with an analytics module of the computing system, estimated tax refund data based on the user current tax related data and the historical tax related data at GENERATE, WITH AN ANALYTICS MODULE OF THE COMPUTING SYSTEM, ESTIMATED TAX REFUND DATA BASED ON THE USER CURRENT TAX RELATED DATA AND THE HISTORICAL TAX RELATED DATA AND THE USER CURRENT TAX RELATED DATA 308, process flow proceeds to GENERATE, WITH THE ANALYTICS MODULE, A CONFIDENCE SCORE BASED ON THE USER CURRENT TAX RELATED DATA AND THE HISTORICAL TAX RELATED DATA, THE CONFIDENCE SCORE INDICATING A LEVEL OF CONFIDENCE IN THE ESTIMATED TAX REFUND DATA 310.

In one embodiment, at GENERATE, WITH THE ANALYTICS MODULE, A CONFIDENCE SCORE BASED ON THE USER CURRENT TAX RELATED DATA AND THE HISTORICAL TAX RELATED DATA, THE CONFIDENCE SCORE INDICATING A LEVEL OF CONFIDENCE IN THE ESTIMATED TAX REFUND DATA 310 the process 300 generates, with the analytics module, a confidence score based on the user current tax related data and the historical tax related data, the confidence score indicating a level of confidence in the estimated tax refund data.

In one embodiment, once process 300 generates, with the analytics module, a confidence score based on the user current tax related data and the historical tax related data, the confidence score indicating a level of confidence in the estimated tax refund data at GENERATE, WITH THE ANALYTICS MODULE, A CONFIDENCE SCORE BASED ON THE USER CURRENT TAX RELATED DATA AND THE HISTORICAL TAX RELATED DATA, THE CONFIDENCE SCORE INDICATING A LEVEL OF CONFIDENCE IN THE ESTIMATED TAX REFUND DATA 310, process flow proceeds to OUTPUT TO THE USER, WITH THE USER INTERFACE MODULE, THE ESTIMATED TAX REFUND DATA 312.

In one embodiment, at OUTPUT TO THE USER, WITH THE USER INTERFACE MODULE, THE ESTIMATED TAX REFUND DATA 312 the process 300 for providing a tax refund confidence indicator to a user of a tax return preparation system outputs to the user, with the user interface module, the estimated tax refund data.

In one embodiment, once the process 300 for providing a tax refund confidence indicator to a user of a tax return preparation system outputs to the user, with the user interface module, the estimated tax refund data at OUTPUT TO THE USER, WITH THE USER INTERFACE MODULE, THE ESTIMATED TAX REFUND DATA 312, process flow proceeds to OUTPUT TO THE USER, WITH THE USER INTERFACE MODULE, THE CONFIDENCE SCORE DATA 314.

In one embodiment, at OUTPUT TO THE USER, WITH THE USER INTERFACE MODULE, THE CONFIDENCE SCORE DATA 314 the process 300 for providing a tax refund confidence indicator to a user of a tax return preparation system outputs to the user, with the user interface module, the confidence score data.

In one embodiment, once the process 300 for providing a tax refund confidence indicator to a user of a tax return preparation system outputs to the user, with the user interface module, the confidence score data at OUTPUT TO THE USER, WITH THE USER INTERFACE MODULE, THE CONFIDENCE SCORE DATA 314, process flow proceeds to END 316.

In one embodiment, at END 316 the process for providing a tax refund confidence indicator to a user of a tax return preparation system is exited to await new data and/or instructions. As noted above, the specific illustrative examples discussed above are but illustrative examples of implementations of embodiments of the method or process for providing a tax refund confidence indicator to a user. Those of skill in the art will readily recognize that other implementations and embodiments are possible. Therefore the discussion above should not be construed as a limitation on the claims provided below.

In one embodiment, a computing system implemented method for providing a tax refund confidence indicator to a user of a tax return preparation system. The method includes receiving, with a user interface module of a computing system, user current tax related data associated with a user of a tax return preparation system and receiving, with a data acquisition module of the computing system, historical tax related data related to previously prepared tax returns. The method includes generating, with an analytics module of the computing system, estimated tax refund data based on the user current tax related data and the historical tax related data and generating, with the analytics module, a confidence score based on the user current tax related data and the historical tax related data, the confidence score indicating a level of confidence in the estimated tax refund data. The method further includes outputting to the user, with the user interface module, the estimated tax refund data and outputting to the user, with the user interface module, the confidence score.

In one embodiment, a system for providing a tax refund confidence indicator to a user of a tax return preparation system. The system includes at least one processor and at least one memory coupled to the at least one processor, the at least one memory having stored therein instructions which, when executed by any set of the one or more processors, perform a process. The process includes receiving, with a user interface module of a computing system, user current tax related data associated with a user of a tax return preparation system, receiving, with a data acquisition module of the computing system, historical tax related data related to previously prepared tax returns, and generating, with an analytics module of the computing system, estimated tax refund data based on the user current tax related data and the historical tax related data. The process further includes generating, with the analytics module, a confidence score based on the user current tax related data and the historical tax related data, the confidence score indicating a level of confidence in the estimated tax refund data, outputting to the user, with the user interface module, the estimated tax refund data, and outputting to the user, with the user interface module, the confidence score.

In one embodiment a non-transitory computer-readable medium having a plurality of computer-executable instructions which, when executed by a processor, perform a method for providing a tax refund confidence indicator to a user of a tax return preparation system. The instructions include a user interface module configured to receive user current tax related data associated with a user of a tax return preparation system, an information acquisition module configured to gather historical tax related data related to previously prepared tax returns, and an analytics module configured to generate estimated tax refund data and confidence score data by analyzing the user current tax related data and the historical tax related data. The confidence score indicates a reliability of the estimated tax refund data is. The user interface module is configured to output the tax refund data and the confidence score data to the user.

In one embodiment, a computing system implemented method for providing a tax refund confidence indicator to a user of a tax return preparation system. The method includes receiving, with a user interface module of a computing system, user current tax related data associated with a user of a tax return preparation system, generating, with an analytics module of the computing system, estimated tax refund data based on the user current tax related data, and generating, with the analytics module, a confidence score based on the user current tax related data, the confidence score indicating a level of confidence in the estimated tax refund data. The method further includes outputting to the user, with the user interface module, the estimated tax refund data and outputting to the user, with the user interface module, the confidence score.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method of predicting an amount of a user's tax refund or tax due, the method performed by a tax return preparation system and comprising:
   receiving, from a system user's device, user information associated with the system user;
   retrieving, from a memory of the tax return preparation system, historical information related to a plurality of prior tax returns;
   identifying at least one of the plurality of prior tax returns that shares at least one selected characteristic with the user information;
   performing, using a predictive model algorithm, an analysis of the user information and the at least one identified prior tax return to generate, in real-time, a predicted amount of the system user's tax refund or tax due based on the analysis;
   determining a confidence score indicating a level of confidence that the predicted amount is correct based on whether the predicted amount is within a range of values indicated in the at least one identified prior tax return;
   generating, in real-time using the tax return preparation system, personalized content for the system user indicating the predicted amount and the determined confidence score concurrently with displaying a graph that visually represents the level of confidence on the system user's device; and
   presenting, in real-time, the system user, with the generated personalized content.

2. The method of claim 1, further comprising:
   receiving additional information associated with the system user;
   updating, in real-time, the predicted amount based on the additional information;
   updating the confidence score based on the updated predicted amount; and
   presenting, in real-time, the updated predicted amount and the updated confidence score to the system user.

3. The method of claim 1, wherein the performing is performed by an analytics module selected from a plurality of interchangeable analytics modules.

4. The method of claim 3, wherein each of the interchangeable analytics modules uses a different predictive model algorithm.

5. The method of claim 1, further comprising:
   generating an advisory statement for the system user based on the predicted amount.

6. The method of claim 5, wherein the advisory statement indicates an interpretation of the predicted amount.

7. The method of claim 6, wherein the advisory statement indicates an interpretation of the confidence score.

8. The method of claim 1, wherein the determining is based on at least one of a z-score, a logistic function, a confidence interval, or a Monte Carlo integration.

9. The method of claim 1, wherein the graph visually represents the level of confidence based on at least one of a percentage, a confidence bar, a number between zero and one, or a tax return range.

10. The method of claim 1, wherein the generating is further based on the confidence score being greater than a value.

11. A system comprising:
    one or more processors; and
    at least one memory coupled to the one or more processors and storing instructions that, when executed by the one or more processors, causes the system to perform operations comprising:
       receiving, from a system user's device, user information associated with the system user;
       retrieving, from a memory of the tax return preparation system, historical information related to a plurality of prior tax returns;
       identifying at least one of the plurality of prior tax returns that shares at least one selected characteristic with the user information;
       performing, using a predictive model algorithm, an analysis of the user information and the at least one identified prior tax return to generate, in real-time, a predicted amount of the system user's tax refund or tax due based on the analysis;
       determining a confidence score indicating a level of confidence that the predicted amount is correct based on whether the predicted amount is within a range of values indicated in the at least one identified prior tax return;
       generating, in real-time using the tax return preparation system, personalized content for the system user indicating the predicted amount and the determined confidence score concurrently with displaying a graph that visually represents the level of confidence on the system user's device; and
       presenting, in real-time, the system user with the generated personalized content.

12. The system of claim 11, wherein execution of the instructions causes the system to perform operations further comprising:
    receiving additional information associated with the system user;
    updating, in real-time, the predicted amount based on the additional information;
    updating the confidence score based on the updated predicted amount; and
    presenting, in real-time, the updated predicted amount and the updated confidence score to the system user.

13. The system of claim 11, wherein the performing is performed by an analytics module selected from a plurality of interchangeable analytics modules.

14. The system of claim 13, wherein each of the interchangeable analytics modules uses a different predictive model algorithm.

15. The system of claim 11, wherein execution of the instructions causes the system to perform operations further comprising:
   generating an advisory statement for the system user based on the predicted amount.

16. The system of claim 15, wherein the advisory statement indicates an interpretation of the predicted amount.

17. The system of claim 16, wherein the advisory statement indicates an interpretation of the confidence score.

18. The system of claim 11, wherein the determining is based on at least one of a z-score, a logistic function, a confidence interval, or a Monte Carlo integration.

19. The system of claim 11, wherein the graph visually represents the level of confidence based on at least one of a percentage, a confidence bar, a number between zero and one, or a tax return range.

20. The system of claim 11, wherein the generating is further based on the confidence score being greater than a value.

* * * * *